3,106,584
PRODUCTION OF LIQUID ALKYLATED PENTABORANE

Jack R. Gould, Monsey, N.Y., and David M. Gardner, Dover, and John E. Paustian, Whippany, N.J., assignors, by mesne assignments, to Thiokol Chemical Corporation, a corporation of Delaware
No Drawing. Filed June 3, 1957, Ser. No. 663,314
2 Claims. (Cl. 260—606.5)

This invention relates to the manufacture of alkylated pentaboranes and, in particular, to the alkylation of pentaborane-9 with olefin hydrocarbons using various catalysts. The products produced in accordance with the method of this invention can be used as fuels when burned with air, as described in the application of Chiras and Mezey, Serial No. 501,742, filed April 15, 1955.

Pentaborane-9 may be prepared by methods which are described in the art; it is a colorless liquid which melts at −46.8° C. The boron hydrides, and pentaborane-9 in particular because of their high heats of combustion, have been recognized as materials which are potentially of value as high energy fuels. The burning of these materials with oxygen liberates considerably more energy than the oxidation of a corresponding weight of hydrocarbon, producing a very high flame temperature. Pentaborane-9 suffers from several disadvantages when used as a liquid fuel. Thus, it has a very disagreeable odor, it has a relatively high vapor pressure, its vapor pressure being 66 mm. of mercury at 0° C. and its boiling point at atmospheric pressure being 58° C., and its vapors are highly toxic.

One of the objects of this invention is to provide a method for producing high energy liquid products from pentaborane-9 which are less volatile and less toxic than the pentaborane-9 but at the same time approach pentaborane-9 in heats of combustion. In accordance with the present invention, it has been found that monoolefin hydrocarbons containing from two to four carbon atoms can be reacted with pentaborane-9 in the presence of certain catalysts which consist essentially of activated alumina to form alkylated pentaboranes which are stable non-volatile liquids with convenient handling characteristics. The presence of these catalysts reduce the time, temperature and pressure necessary for the reacton to satisfactorily proceed, and increase the yields of the alkylated pentaboranes.

The following examples illustrate embodiments falling within the scope of the invention but are not to be considered limiting. In the examples, the term "moles" signifies gram moles.

*Example I*

This experiment was conducted in a closed system, gas recycling apparatus consisting of a reactor bed made of glass 12 inches high and ½ inch in diameter, inserted in an electrically heated furnace. This bed was positioned vertically and a glass tube leading from the bottom thereof extended into the interior lower portion of a 100 ml. glass container which served as a trap. A second tube led from the upper portion of this trap into a stainless steel bellows type circulating pump and from there to a 200 ml. spherical shaped surge bulb. The tube then extended through a conventional type gas flow meter and into the bottom portion of a 2 liter gas storage and mixing vessel. A manometer led from the tube just previous to its entrance into the mixing vessel. A tube led from the upper portion of the mixing vessel to the upper portion of the reactor bed. A vacuum apparatus was affixed to the system to permit evacuation when desired, and an inlet provided through which gases could be introduced into the system at will. 10 grams of pelletized alumina catalyst having a size of approximately 8–12 mesh was placed in the reaction bed and the system was evacuated. The catalyst was then activated by heating for three hours at 400–450° C. by means of the electrically heated furnace.

The apparatus was then allowed to cool and 11.96 millimoles of propylene and 11.70 millimoles of pentaborane-9 introduced therein, and sufficient nitrogen gas allowed to enter to pressurize the system at 76 centimeters of mercury or atmospheric pressure. The circulating pump was then started and adjusted to circulate the gaseous constituents through the system at 100–250 cubic centimeters per minute (S.T.P.), and the temperature of the reactor bed raised to 180–190° C. by means of the electrically heated furnace. The manometer indicated a pressure drop signifying that a reaction was taking place. Additional nitrogen was admitted into the system throughout the reaction to maintain the pressure at 76 centimeters of mercury. When the apparatus had recycled the gaseous reactants 18 times (total apparatus volume 3000 cc.), the heating elements were turned off, the apparatus allowed to cool and the gaseous contents removed by the vacuum apparatus. The liquid which had condensed in the trap beneath the reactor bed was then removed, analyzed chemically and by infrared and found to be a mixture of monopropylpentaborane ($C_3H_7B_5H_8$) and tripropylborane. The monopropylpentaborane was isolated by vacuum distillation and weighed 0.710 gram (6.74 millimoles). The yield was 72 percent based upon pentaborane-9 consumed (75 percent, based upon propylene consumed).

*Example II*

A high pressure stainless steel reaction vessel having a capacity of 550 cc. was flushed with dry nitrogen and charged with 0.56 mole of liquid pentaborane-9, 0.66 mole of propylene and 8.60 grams of alumina having a size of approximately 8–12 mesh which had been activated by heating for about three hours at 400–450° C. in a vacuum ($10^{-2}$ mm. of mercury absolute pressure). The vessel was closed, placed on an automatic rocking device and heated to 125° C. for 4½ hours. Autogenous pressure of 300 to 400 p.s.i.g. developed in the vessel. The vessel and its contents were then cooled to atmospheric temperature and the gaseous products vented and analyzed. The liquid residue was transferred in the absence of air to a flask and distilled. A fore run of unreacted pentaborane was then removed from the liquid mixture. Under reduced pressure the propylpentaborane amounting to 0.082 mole was isolated and analyzed by its infrared spectrum. This analysis showed that the sample was monopropylpentaborane. The residue consisted of polypropylpentaboranes and tripropylpentaborane. The yield was 68 percent based on the unrecovered pentaborane. The percentage conversion of pentaborane-9 was 18 percent.

*Example III*

This experiment was performed in the manner described in Example II. However, instead of using 8.60 grams of actviated alumina as the catalyst there was employed 8.60 grams of catalyst which was chromia supported on activated alumina. The chromia amounted to approximately 20 percent by weight of the catalyst and the catalyst was about 8–12 mesh size. In this example, the reaction was run for a period of 4⅙ hours and the maximum autogenous pressure developed was 340 p.s.i.g. 0.064 mole of monopropylpentaborane was produced, the yield being 53 percent based on unrecovered pentaborane-9.

Various modifications can be made in the procedures of the specific examples to provide other embodiments which fall within the scope of the present invention.

Thus, in place of the propylene there can be utilized other monoolefin hydrocarbons having from 2 to 4 carbon atoms, namely, ethylene, 1-butene and 2-butene. The molar range of monoolefin hydrocarbon to pentaborane-9 introduced into the reaction system will generally be within the range from 1:5 to 5:1, the reaction temperature will generally be within the range from 75° C. to 250° C., the reaction pressure will generally be within the range from atmospheric to 500 p.s.i.g. and the reaction time will generally be within the range from 1 to 10 hours. The catalyst employed can be activated alumina as such or it can consist of activated alumina having supported thereon one or more metal oxides, such as chromia or molybdena. Activated bauxite is also a useful catalyst in the process.

It is claimed:

1. A method for the production of a liquid alkylated pentaborane which comprises reacting a monoolefin hydrocarbon having from 2 to 4 carbon atoms and pentaborane-9 at a temperature within the range from 75° C. to 250° C. and at a pressure from atmospheric pressure to 500 p.s.i.g. while the reactants are in contact with a catalyst consisting essentially of activated alumina, the molar ratio of said monoolefin hydrocarbon to pentaborane-9 introduced into the reaction zone being within the range from 1:5 to 5:1.

2. The method of claim 1 wherein the monoolefin hydrocarbon is propylene.

No references cited.